United States Patent Office 3,044,877
Patented July 17, 1962

3,044,877
PELLETED ANIMAL FEED AND PROCESS
Albert Lent, Tucson, Ariz., assignor to Erly-Fat Livestock Feed Co., Tucson, Ariz., a corporation of Arizona
No Drawing. Filed Feb. 17, 1960, Ser. No. 9,168
13 Claims. (Cl. 99—8)

The present invention relates generally to animal feeds and more particularly to a novel pelleted animal feed which contains fresh green forage such as young leguminous and nonleguminous plants and grasses.

As is well known to stock men, young immature green forage such as grasses and leguminous plants are of great nutritional value to cattle, sheep, horses, swine and poultry. This distinctive value is due to the fact that the juice of all freshly harvested forage contains the protoplasm of the plant. It has an average of 20% solids and the balance water, or it may be a suspension media of the many components of protoplasm. This grass juice, within the cells of the plant, contains, in their most digestible form, proteins, carbohydrates, minerals, vitamins, enzymes, and estrogens.

Generally, the younger the plant or grass, the higher the concentration of protein, minerals, vitamins, enzymes and the like necessary for building growth, maintenance, health and the different products of animal production including beef, milk, mutton, eggs and poultry. The highest concentration of the aforementioned nutritional elements is found in pasture grasses, young alfalfa or grasses of cereal grains just before the stem joints. In alfalfa, for example, this is found just before the buds are formed. Also, this period before jointing and before the buds are formed is the point of lowest fiber content and of the totally indigestible part of fiber lignin. The exception to this rule in alfalfa and other legumes is the estrogenic factor which apparently has different concentrations in the plant at different periods in growth. For example, in alfalfa the highest concentration is in the one fourth bloom stage of the first cutting. However, as a general rule, all legumes have more estrogenic value than grasses, and this value is present in all stages of legumes and is preserved by following the teachings of the present invention. As lignin increases, the protein, mineral, and vitamin contents of the plant drop very drastically. The difference in fiber content as between young, and mature legumes and grasses is illustrated in Table I.

Table I

| Kind of Grass | Percent of Fiber Content | Kind of Grass | Percent of Fiber Content |
|---|---|---|---|
| Green Alfalfa 10″ high | 7 | Green Alfalfa half bloom. | 22 |
| Immature clover | 4 | Mature clover | 25 |
| Oat grass before jointing | 5.4 | Oat grass green but heading. | 27 |
| Sudan grass 10″ high | 5.6 | Sudan grass 20″ high. | 30 |
| Wheat grass 10″ high | 3.9 | Wheat grass green but heading. | 24 |

Table I further illustrates that the fiber content in young legumes and grasses is about the same as in grains and other concentrates, as differentiated from mature hays and other roughage, hence much more digestible. It has been established that the immature roughage averages 15% to 20% greater digestibility than the mature roughage under the same conditions. Another important feature or advantage of young legumes and grasses is that the proteins, carbohydrates, minerals, vitamins, estrogens and enzymes contained therein function as catalysts or stimulants to aid the animal in digesting the green forage.

In the past, legumes and grasses have been preserved for feeding purposes by natural field drying, artificial drying, or dehydration, and by ensiling. However, nutritive losses average in the neighborhood of 45% in natural drying, 35% in artificial drying, and 30% in ensiling. Consequently, the only two ways in which a livestock producer can now utilize the highly important values in immature green forages is by pasturing or by cutting the forage green and feeding it to penned animals. Both methods have obvious disadvantages.

It is an object of the present invention, therefore, to provide a means for preserving substantially all of the nutrient value and growth factor of the young green forage in an animal feed without the disadvantages which result when green cut forage is field-dried or dehydrated or used in its natural state. More particularly, it is an object to provide a novel pelleted animal feed which contains concentrated green forage juices and cells together with their substantially unimpaired high mineral, protein, vitamin, enzymatic and estrogenic material content.

Another object is to provide a novel pelleted animal feed which is relatively high in vitamin A content. More particularly, it is an object to provide such a pelleted animal feed wherein the vitamin A content in the interior thereof is not appreciably adversely affected by the pelleting process.

A further object is to utilize potentially valuable roughage which is relatively unpalatable, so as to produce a usable animal feed. More particularly, it is an object to pelletize together unpalatable roughage and young green cut forage whereby the roughage absorbs the forage juices and cells with relatively little loss of the valuable nutrients contained therein.

Yet another object is to provide a pelleted animal feed which contains a relatively high content of green forage juices and cells and which can be stored for relatively long periods of time without the formation of mold.

Further objects and advantages of the present invention will be apparent from the following detailed description wherein preferred embodiments of the present invention are described.

Briefly stated, the invention comprises the pelleting of fresh green forage such as young grasses and legumes with cellulose waste material such as cotton gin waste, bagasse and the like under predetermined conditions of pressure and temperature so as to reduce enzyme destruction and oxidation, and seal in the forage juices and cells without materially reducing the nutrient values thereof.

It is to be understood that when the term "green forage" is used in the application, it is intended to include all types of leguminous and nonleguminous plants and grasses such as alfalfa, clover, and the like, oats, barley, rye, wheat and the like, and Bermuda grass, timothy grass, Sudan grass, and the like. The term "young" is intended to describe such legumes and grasses when the grasses are approximately ten inches high or before jointing, and the legumes have not yet started to bloom. Also, when the term "cellulosic waste material" is used, it is intended to include cotton gin waste, cotton burrs, cotton motes, bagasse, ground corn cobs, flax shives, rice bran and hulls, pineapple waste, and the like which are capable of absorbing up to 30% or more of liquid.

As indicated hereinabove, I have discovered that substantially all of the nutritive values of young green forage can be retained by pelletizing it with cellulosic waste material in predetermined proportions and under preselected conditions of pressure and temperature. In the preparation of green forage for pelleting, it is advisable to grind the forage as finely as possible, as by means of a hammermill or chopper. The greater the rupturing of the cells, the more the grass juice is released and the easier the chopped green forage and its juice will mix and absorb in other materials with which it is pelleted. It appears that when the pellets are formed under the aforementioned conditions they contain a relatively hard coating which seals in the forage juices and cells without destroying or substantially reducing the value of the nutrient elements. By this procedure the enzyme action which occurs during the conventional field drying of green forage is stopped and the chemical action which occurs during ensiling is avoided, thereby obviating or substantially reducing the destruction of the aforementioned nutrient values as normally occur when known processes are employed for preserving forage. The cellulosic waste material previously mentioned is well suited for this purpose, both because of its low cost and availability and also because it readily absorbs and retains the green forage juices.

Although the aforementioned waste material has been used alone as an animal feed, it has not been entirely satisfactory because it is often so unpalatable that an animal will not eat enough to justify its use from a cost standpoint. Also, the waste material alone is digested at a very low level.

On the other hand, when the young green forage is added to the celluosic waste material and the mixture is compressed into pellets using pressures of from about 10,000 to about 60,000 pounds per square inch, the waste material provides the bulk and the envelope or casing means for protecting the forage juices and cells and the green forage provides the nutrients and moisture content which make the entire unit palatable.

The amount of green forage which can be used in the pellet in the absence of mold inhibitors is limited primarily by the amount of resultant moisture in the pellet. Thus, 14% moisture in the resulting pellet does not present any molding problem, and 19% moisture will not mold in dry areas. However, when mold inhibitors are used, pellets containing as high as 31% moisture did not mold during an approximately three months' period. I have also determined that sodium propionate is one of the most efficient inhibitors of mold in this type of product. Therefore, if it is desirable to have pellets or cakes with higher than about 14% moisture, this can be achieved by the use of this inhibitor which can be mixed with the feed material before pelleting, either in the dry form or dissolved in water or molasses. Table II illustrates the value of sodium propionate as a mold inhibitor in an animal feed produced in accordance with the teachings of the present invention, wherein the green forage which was used had a moisture content in the range of from about 65% to about 85%, with the majority in the range of from 70% to 80%.

tors must be taken into consideration. Thus, if less than 10% green forage, by weight, is used, there is insufficient nutritional addition; also, the pellet is so dry that pelleting temperatures build up to a point where the vitamin and enzyme values are adversely affected. On the other hand, if the green forage content is greater than about 33%, by weight, the moisture content is too high with the result that the pellet does not retain its form and cannot be handled on a commercial basis.

Turning to a consideration of the pelleting procedure, as mentioned hereinabove, the cellulose material provides the bulk, absorbs and retains the fresh green forage juices and cells, and when the materials are compressed it also apparently functions as an encasing material or protective coating for the juices and nutrients contained therein. In addition, the green forage juices in the pellet lower the temperature of the pellet during the forming operation and thereby reduce the destruction of the enzyme and vitamin values.

As is well known to stockmen, oxidation and heat throughout the forage material, as occur when legumes and young grasses are field dried, destroy a large percentage of the nutrient values. Furthermore, the same type of destruction by heat occurs when dry feed mix is pelleted without the green forage additive.

Thus, when dry feed mix is pelleted at a pressure of from about 50,000 to about 60,000 pounds per square inch on a machine in which the pelleting apertures are contained in a moving tape, the temperatures may build up to as high as 120° C., depending on the particular mix which is being pelleted. By way of example, pellets were formed from a dry feed mix using a ⅜-inch tapered die and it was ascertained by means of a pyrometer that the temperature of the die ranged from 61° C. to 65° C. and the temperatures within the pellets ranged from 63° C. to 66° C. However, when the same dry feed had mixed with it 25% by weight of fresh green grass containing 75% moisture, the temperature of the die ranged from 31° C. to 33° C. and the internal temperatures of the pellets ranged from 31° C. to 32° C. Consequently, it is readily apparent that the use of the fresh green forage reduced the forming temperatures to approximately one half with a resultant reduction in the destruction of the nutrient values.

Viewed from another standpoint, it is recognized that one of the nutrient values most easily destroyed by the curing or dehydration of green forage is the carotene, the precursor of vitamin A, commonly regarded as vitamin A in the feeding of ruminant animals. The same type of loss occurs in the pelleting of dry feed material, and it has been established that this loss is in the neighborhood of about 15% to about 25%. To ascertain the

*Table II*

| Key No. | Materials, Parts by Weight | Percent Moisture in Pellet | 0 Days | 7th Day | 14th Day | 25th Day | 53rd Day | 84th Day |
| --- | --- | --- | --- | --- | --- | --- | --- | --- |
| A-1 | 18 Green Forage, 82 Waste, No Inhibitor | 20.36 | No Mold | Mold | Mold | Mold | Mold | Mold |
| A-2 | 18 Green Forage, 82 Waste, .0015 Inhibitor | 24.55 | ---do--- | No Mold | No Mold | ---do--- | ---do--- | Do. |
| A-3 | 18 Green Forage, 82 Waste, .003 Inhibitor | 23.21 | ---do--- | ---do--- | ---do--- | No Mold | No Mold | No Mold |
| B-1 | 25 Green Forage, 75 Waste, No Inhibitor | 33.45 | ---do--- | Mold | Mold | Mold | Mold | Mold |
| B-2 | 25 Green Forage, 75 Waste, .0015 Inhibitor | 29.66 | ---do--- | ---do--- | ---do--- | ---do--- | ---do--- | Do. |
| B-3 | 25 Green Forage, 75 Waste, .003 Inhibitor | 26.25 | ---do--- | No Mold | No Mold | No Mold | No Mold | No Mold |
| C-1 | 33.3 Green Forage, 66.6 Waste, No Inhibitor | 38.20 | ---do--- | Mold | Mold | Mold | Mold | Mold |
| C-2 | 33.3 Green Forage, 66.6 Waste, .0015 Inhibitor | 33.91 | ---do--- | ---do--- | ---do--- | ---do--- | ---do--- | Do. |
| C-3 | 33.3 Green Forage, 66.6 Waste, .003 Inhibitor | 31.20 | ---do--- | No Mold | No Mold | No Mold | No Mold | No Mold |

As indicated hereinabove, in the absence of a mold inhibitor, the amount of young green forage which is used will depend primarily on the moisture content thereof. However, when a mold inhibitor is used, other factors extent of the advantage of the present invention in this respect, 20% green grass of 83.7% moisture content was mixed with 80% alfalfa meal so that the mixture contained 72,000 units of carotene (or vitamin A) per pound.

The mixture was then pelleted in a ⅜-inch aperture die which had previously been used for pelletizing a dense feed material so that the temperature of the die was in excess of 85° C. The inside temperatures of the pellets made from the aforementioned mix containing fresh green forage, as read on a pyrometer, were about 85° C. Immediately after removal from the die, the temperature of the pelleted material dropped to about 70° C. A thin layer was removed from the outside of the pellets and it analyzed 60,000 units of vitamin A per pound and the entire pellet averaged 67,000 units per pound. Thus, when green forage is used in the mix, the destruction of vitamin A is in the neighborhood of 7%, whereas when dry mix alone is pelleted, the loss is in the range of about 15% to about 25%.

It also appears that the fresh forage aids in the sealing effect of the encasing material because when it is used in the pelleting process, the outer surface of the pellet becomes quite smooth and air-tight so as to seal the aforementioned juices within the pellet.

Although the use of young green forage with cellulosic waste material in the production of a pellet-type feed is one of the primary advantages of the present invention, young green forage can also be used in the pelletizing of other types of dry feed of higher nutritional value such as hay and the like. It is also to be understood that although the young green forage and the cellulosic waste material or other feed will normally comprise the major components, well known supplements such as molasses, vitamins, and the like can be added depending on economics and the result desired.

Thus, it is apparent that there has been provided a novel pelleted green forage feed which fulfills all of the objects and advantages sought therefor. The use of young green forage with cellulosic waste material provides a pellet with a smooth, substantially air-tight outer surface which seals in the fresh green forage juice with its highly beneficial proteins, carbohydrates, minerals, vitamins, estrogens and enzymes. In addition, the young green forage causes the cellulosic waste material to be quite palatable to the stock being fed, and the waste material absorbs and acts as a carrier or host for the fresh forage juices. The use of the young green forage in the pellet also reduces the pelletizing temperature to approximately half of what it would be without the young green forage, thereby materially reducing the destruction of the nutrient values as occurs with increased temperatures. When the moisture content of the pellet is about 14% or below, the pellet can be stored for long periods of time without the formation of mold. On the other hand, when higher moisture content is desired, a mold inhibitor such as a sodium propionate can be used to prevent the formation of mold.

It is to be understood that the foregoing description and examples have been given only by way of illustration and that both the product and process are susceptible to variation without departing from the scope of the present invention, which is limited only by the claims which follow.

I claim:

1. A pelleted animal feed consisting essentially of: young green forage; and dry feed material, and having a moisture content of less than about 14%.

2. A pelleted animal feed consisting essentially of: young green forage; and cellulosic waste material, the moisture content thereof being less than about 14%.

3. A pelleted animal feed, comprising: a major proportion of dry feed material; and a minor proportion of young green forage.

4. A pelleted animal feed, comprising: a major proportion of dry feed material; a minor proportion of young green forage; and a mold inhibitor.

5. A pelleted animal feed, comprising: a major proportion of dry feed material; a minor proportion of young green forage; and sufficient sodium propionate to inhibit the formation of mold caused by the presence of moisture in the pellet.

6. The method of producing pelleted animal feed which includes the steps of: mixing together dry feed material and fresh green forage; and pelletizing the mixture under pressures from about 10,000 to about 60,000 pounds per square inch.

7. The method of producing pelleted animal feed which includes the steps of: comminuting fresh green forage to rupture the cells thereof; mixing together said comminuted fresh green forage and dry feed material; and pelletizing the mixture under pressures of from about 10,000 to about 60,000 pounds per square inch.

8. The method of producing pelleted animal feed which includes the steps of: comminuting fresh green forage to rupture the cells thereof; mixing together dry feed material and from about 10% to about 33%, by weight, of said comminuted forage having a moisture content of from about 65% to about 85%; and pelletizing the mixture under pressures of from about 10,000 to about 60,000 pounds per square inch.

9. The method of producing pelleted animal feed which includes the steps of: mixing together from about 10% to about 33%, by weight, of fresh green forage having a moisture content between about 65% and about 85%, and the remainder cellulosic waste material; and pelletizing the mixture under pressures from about 10,000 to about 60,000 pounds per square inch.

10. The method of producing pelleted animal feed which includes the steps of: mixing together from about 10% to about 33%, by weight, of fresh green forage having a moisture content between about 65% and about 85%, cellulosic waste material, and sodium propionate; and pelletizing the mixture under pressures from about 10,000 to about 60,000 pounds per square inch.

11. The method of producing pelleted animal feed which includes the step of mixing fresh green forage with dry feed material prior to pelletizing the mixture under pressure so as to reduce the forming temperature of the pellet and thereby lessen the destruction of the nutrients in the feed.

12. The method of producing pelleted animal feed which includes the step of mixing from about 10% to about 33%, by weight, of fresh green forage with dry feed material prior to pelletizing the mixture at a pressure of from about 10,000 to about 60,000 pounds per square inch so as to reduce the forming temperature of the pellet and thereby lessen the destruction of the nutrients in the feed.

13. The method of producing pelleted animal feed which includes the step of mixing from about 10% to about 33%, by weight, of fresh green forage having a moisture content between about 65% and 85% with dry feed material prior to pelletizing the mixture so as to reduce the forming pressure of the pellet and thereby lessen the destruction of the nutrients in the feed.

References Cited in the file of this patent

UNITED STATES PATENTS

| | | |
|---|---|---|
| Re. 5,981 | Page | July 21, 1874 |
| 2,223,904 | Zentz et al. | Dec. 3, 1940 |
| 2,503,416 | Russell | Apr. 11, 1950 |
| 2,559,459 | Peebles et al. | July 3, 1951 |